Nov. 11, 1958     H. H. MORSE     2,859,612
TESTER FOR FUEL DELIVERY SYSTEM
Filed Oct. 1, 1956     2 Sheets-Sheet 2
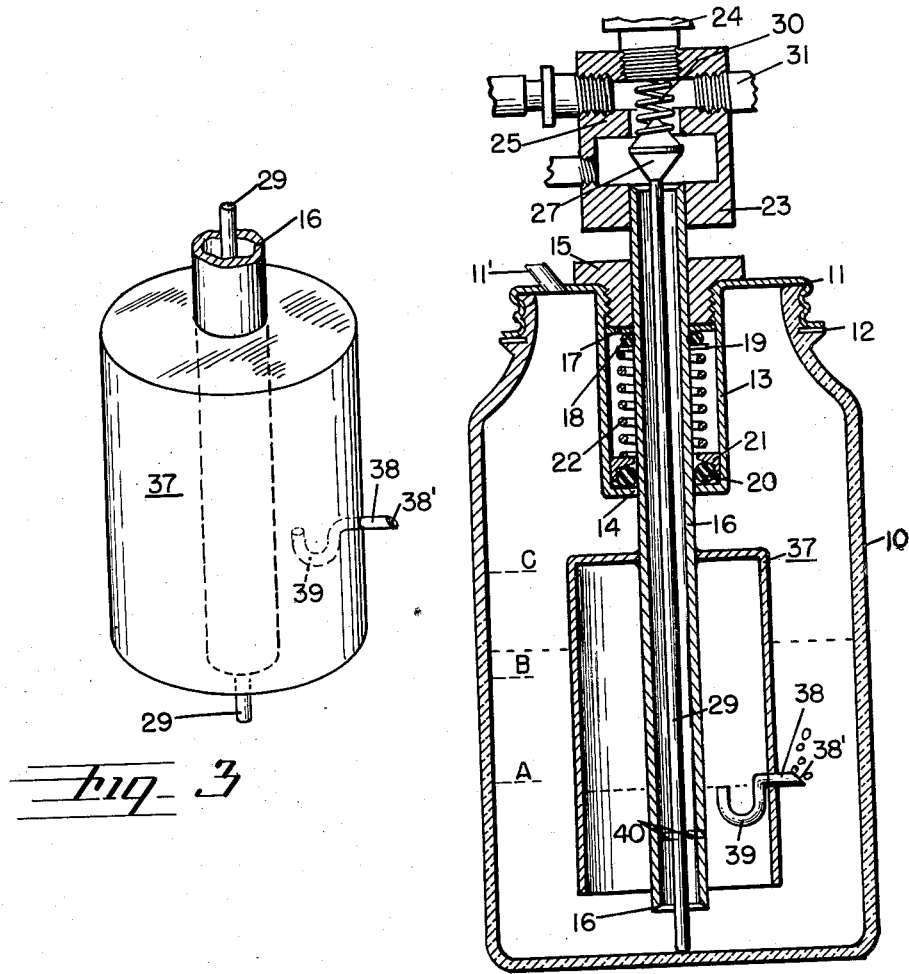
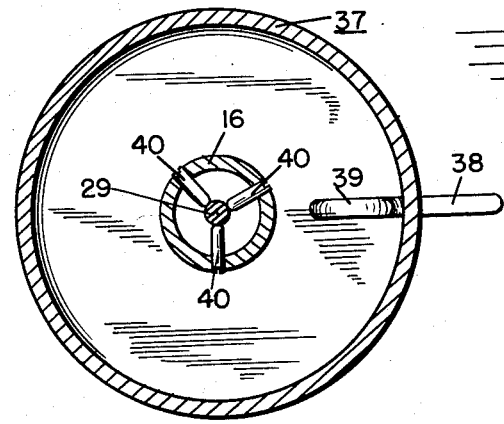
INVENTOR.
HOWARD H. MORSE
BY
ATTORNEY

United States Patent Office 2,859,612
Patented Nov. 11, 1958

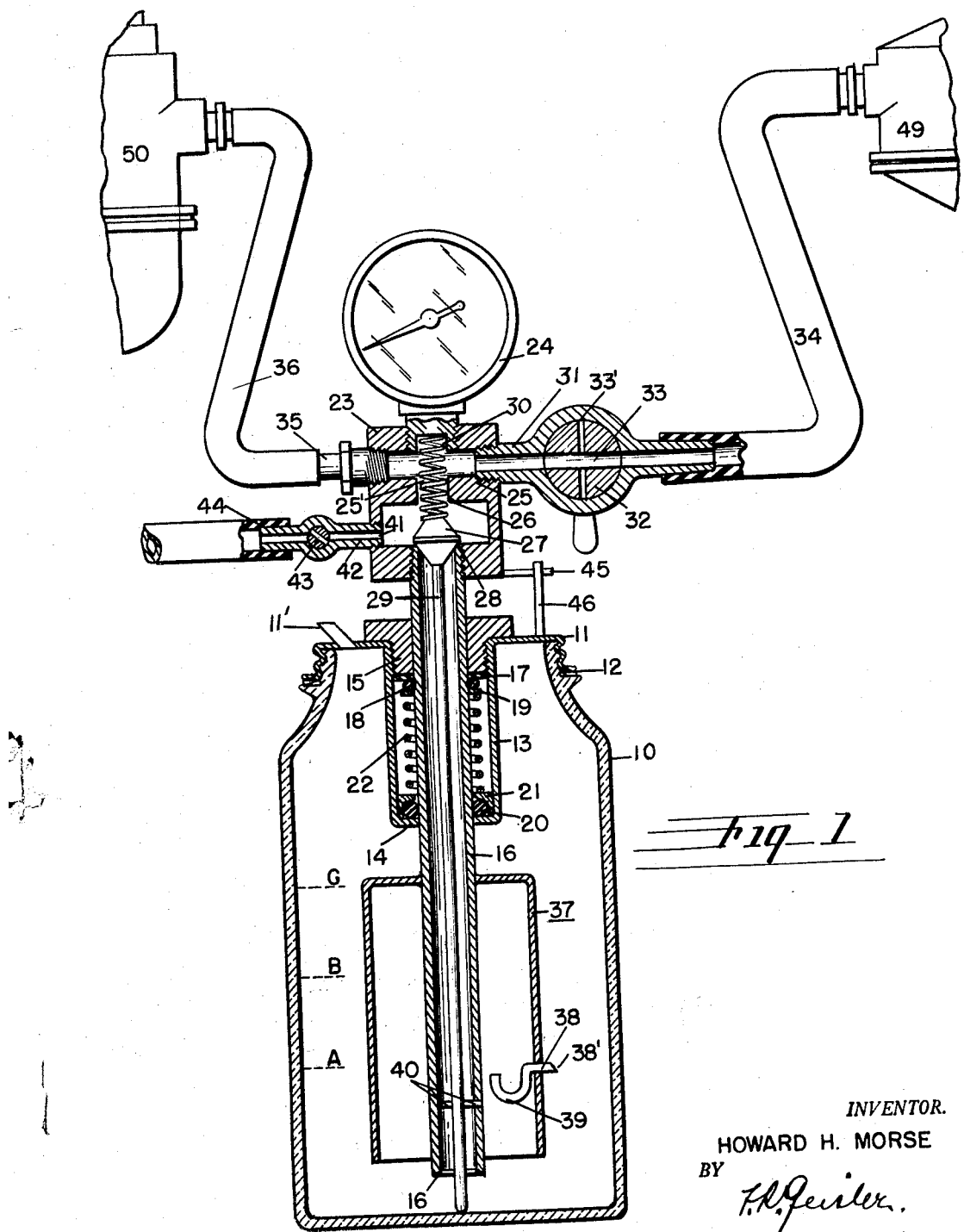

2,859,612

TESTER FOR FUEL DELIVERY SYSTEM

Howard H. Morse, Portland, Oreg.

Application October 1, 1956, Serial No. 613,115

4 Claims. (Cl. 73—118)

This invention relates to means for testing the delivery system by which liquid motor fuel for an internal combustion motor, particularly for the motor in an automotive vehicle, is supplied from the motor fuel tank.

This application is a continuation-in-part of the pending application Serial No. 528,337, filed under date of August 15, 1955, and entitled, "Testing Means for Fuel System," and, like the previous application, is concerned not only with means for testing the performance of the fuel pump in the system but also, and more especially, with the ascertaining of the existence of any air leakage into the system between the fuel tank and the pump.

In the device of the present invention, during the course of the testing of the fuel system, the fuel is caused to be delivered into a receptacle having a transparent wall so that the delivered fuel in the course of the test can be observed for the purpose of detecting any air bubbles in the same. Any such air bubbles would, of course, indicate an air leak somewhere along the line on the suction side of the pump. As is well known, however, there may be, and generally will be, some vapor bubbles in the delivered fuel, and the problem has been to prevent an inexperienced observer or tester from confusing vapor bubbles with air bubbles.

In the device described in the pending application Serial No. 528,337, the air bubbles and the vapor bubbles are caused to follow separated paths as they rise to the surface of the fuel delivered into the receptacle of the testing device. For the fuel delivery systems of most automotive vehicles, under ordinary conditions, the means described in the previous application by which the vapor bubbles and air bubbles are separated will work satisfactorily. However, in installations where a large volume of flow of the fuel takes place and is accompanied with the relatively higher vacuum suction necessary for producing a large volume flow, the amount of bubbles may be increased beyond the capacity of the device of the previous application for clearly and accurately separating the air bubbles from the vapor bubbles.

An object of the present invention accordingly is to provide a further improvement in such fuel system testing means which will enable the air bubbles to be separated from the vapor bubbles and to be discharged from the delivered fuel in a path entirely by themselves even though a large volume flow of the fuel takes place into the receptacle of the testing device and even though such delivered fuel carries an excessive amount of vapor developed as a result of the suction to which it has been subjected under the action of the fuel pump.

It is a well known fact that, when vapor develops in liquid fuel, such as gasoline, as a result of the subjecting of the liquid to suction or partial vacuum, this vapor can be made to return to liquid state if the liquid fuel and vapor are subjected to sufficiently increased pressure.

A further object of the present invention accordingly is to provide means in a fuel testing device of the type indicated whereby the delivered fuel will be subjected to increased pressure in order that the vapor in the fuel, instead of passing off from the fuel as vapor bubbles, will revert back to a liquid state, thus to a large extent eliminating the discharging of vapor bubbles from the fuel under test and in this manner limit the final discharged bubbles to air bubbles and thus enable the discharging of air bubbles from the delivered fuel to be unmistakably discerned.

The improved means by which these objects are attained in the testing device of the present invention and the manner in which such improved means functions will be explained briefly with reference to the accompanying drawings.

In the drawings:

Figure 1 is an elevation, partly in section, of the entire fuel system testing device including the improved means embodying the present invention, this figure showing the device in position prior to the special testing for air leaks in the fuel delivery line;

Figure 2 is a corresponding sectional elevation illustrating the employment of the device particularly for testing air leaks in the fuel delivery line as well as for making a flow test;

Figure 3 is an enlarged perspective view of a special means or air bell through which the principal objects of the present invention are attained; and Figure 4 is a bottom plan view of the air bell portion of the device shown in Figure 3.

In Figures 1 and 2 the transparent glass jar 10 is the receptacle into which the fuel is delivered in the testing of the fuel system. The receptacle 10 has a circular neck which is formed with threads to accommodate the threads of a cap 11 which fits on the top of the receptacle and has sealing engagement with an interposed gasket 12. The cap has an air vent 11'.

The cap 11 is formed with a central downwardly-extending or recessed cylindrical portion 13 which is open at the bottom and terminates in an annular inwardly-extending flange 14. This recessed cylindrical portion 13 is threaded on the inside at the top for engagement with a retainer nut 15.

A tube 16 extends down into the receptacle 10, having a sliding fit in the retainer nut 15 and also sliding within the flange 14. A spring 22 surrounds the tube 16 in the recess 13 of the cap 11. The lower end of this spring 22 engages a washer 21 located at the bottom of the recess 13, and a suitable seal 20, preferably of neoprene, is interposed between the washer 21 and the bottom flange 14. The upper end of the spring 22 engages a steel washer 19 which, in turn, engages a steel spring ring 18 secured in a groove on the tube 16. A fiber washer 17 is placed between the bottom of the retainer nut 15 and the spring ring 18. The spring 22 is held under compression at all times between the upper washer 19 and the bottom washer 21, and thus the spring 22 normally maintains the tube 16 in the maximum raised position shown in Figure 1 when the device is set up, but permits the tube 16 to be pushed downwardly a limited distance with respect to the cap 11 and receptacle 10 against the force of spring 22.

A housing 23 (Figure 1) is secured on the upper end of the tube 16. This housing 23 in turn supports a pressure gauge 24 of standard construction, the gauge being connected by a channel with the interior of the housing 23. The housing 23 is formed with a transversely extending partition 25 which has a central channel 25' connecting the upper and lower portions of the housing 23.

A valve member 27, preferably shaped substantially as shown in Figure 1, is located in the lower portion of the housing 23 and is secured to the top end of a rod 29.

The top end of the tube 16 is beveled so as to form a lower valve seat 28 for the valve member 27, and the wall at the bottom of the channel 25' in the housing 23 is similarly beveled to form an upper valve seat 26 for the valve member 27. A spring 30, located in the upper portion of the housing 23 engages the valve member 27 for the purpose of normally holding the valve member 27 down against the lower valve seat 28.

The upper portion of the housing 23 has an inlet port in which the end of a connecting member 31 is secured. A flexible tube 34 is attached to the outer end of this connecting member 31 and is adapted to be attached to the fuel pump 49 when the device is set up. The connecting member 31 also houses a rotary valve 32. The valve 32 is provided with a regular flow passageway 33 and also with a restricted flow passageway 33'. Normally the valve is positioned as shown in Figure 1 so that the flow from the pump 49 during the testing operation will pass through the regular or unrestricted passageway 33.

The upper portion of housing 23 also has a corresponding outlet port in which a nipple connector 35 is secured. A flexible tube 36 is attached to the outer end of the nipple 35 and is adapted to be connected to the motor carburetor 50 when the testing device is set up.

The valve rod 29 for the valve member 27 extends downwardly through the tube 16 and extends substantially to the bottom of the transparent receptacle 10. The tube 16, however, terminates above the bottom of the receptacle. A suitable guideway 40 (Figure 4) is provided in the lower portion of the tube 16 so as to keep the valve rod 29 centered in the tube while permitting relative movement axially of the tube with respect to the rod.

Since the bottom of the tube 16 is normally spaced a short distance above the bottom of the receptacle 10 while the valve rod 29 extends to the receptacle bottom, it will be apparent from Figure 1 that a downward thrust on the housing 23 and tube 16, by causing the lower valve seat 28 to move downwardly away from the valve member 27, will open the valve-controlled entrance from the lower portion of the housing 23 into the tube 16. Also further downward thrust on the housing 23 and the tube 16, by bringing the upper valve seat 26 into contact with the valve member 27, will close the passageway or central channel 25' leading from the upper portion of housing 23 to the lower portion. In other words, when the tube 16 is in its normal raised position, as illustrated in Figure 1, the valve member 27 will be in its relative lower closed position; when the tube 16 and with it the housing 23 is thrust downward a slight distance, against the force of spring 22 and also the force of spring 30, the valve member will be in its relative open position illustrated in Figure 2; and when the tube 16 and housing 23 are thrust a sufficient distance downwardly the valve member 27 will be in its relative upper closed position. The purpose for providing for these relative changes of valve position will be presently apparent.

The housing 23 is provided with a second outlet port 41 in which an end of a connecting member 42 is secured. A flexible discharging tube or hose 44 is attached to the outer end of member 42, and, when the test device is set up, the free end of the hose 44 is inserted in the filler neck of the fuel tank of the motor. The connecting member 42 houses a shut-off valve 43 which is kept closed at all times except at the termination of the test, as later explained.

A cylindrical housing, designated as a whole by the reference character 37 which serves in part as an air chamber, and which, for want of a better term, is referred to as an "air bell," is rigidly secured at its top of the tube 16. The top of this air bell 37 is closed and is airtight, having an airtight connection with the tube 16. The bottom of this air bell is entirely open and is located approximately in the same horizontal plane as the bottom end of the tube 16. As indicated in the drawings, the inside diameter of the air bell 37 is considerably greater than the outside diameter of the tube 16 and preferably is several times greater.

An air outlet tube 38 is mounted in the air bell 37 being located preferably about two-thirds of the distance from the top to the bottom of the air bell, and this outlet tube 38 extends horizontally through the wall of the air bell and terminates on the outside a short distance from the cylindrical wall of the air bell. The outer end of this outlet tube preferably is cut off obliquely as shown at 38', thus giving an oblique upward slope to the end of the tube. Inside the air bell the tube 38 is formed with a downwardly-extending U-shaped portion 39, the top of which is located approximately in the same horizontal plane as the outside portion of the tube.

When the device is set up and connected in the manner described and as illustrated in Figure 1, and thus with the valve 32 in the flow line from the pump 49 having its main passageway open, with the valve 43 closed, and with the valve member 27 engaging the lower valve seat 28 and thus closing the entrance into the tube 16, the motor and fuel pump are operated and the pressure on the gauge 24 noted. The motor and pump are then stopped and the gauge observed. If the gauge pressure drops towards zero this would indicate a leak either at the discharge check valve of the pump 49 or at the needle and seat of the carburetor 50. The location of such leak is determined by again operating the motor and pump to bring the gauge up to the preceding reading, then stopping the motor and pump and pinching or clamping one of the flexible tubes 34 or 36, momentarily preventing any passing of fuel therethrough, and observing the gauge. Thus, for example, if the tube 34 is closed in this manner and the gauge pressure drops, this will indicate a leak in the carburetor 50, whereas if the gauge pressure does not drop under such circumstances this will indicate that the leak is in the pump.

Assuming that there is no leak either in the carburetor or in the pump, the next step in the test would be to test the pump performance. For this purpose the motor and pump are again started and the tube 16, housing 23 and gauge 24 are pressed downwardly with respect to the receptacle 10 until the valve member 27 is caused to be in the relative middle or neutral position illustrated in Figure 2, in which case the fuel delivered by the pump will pass down through the tube 16 and into the receptacle 10.

The transparent wall of the receptacle 10 is provided with suitable volume indicating markings, such as the lines A, B and C, the lowest line being the starting level for the flow test and the lines B and C arranged to indicate proper volume flow for small and large pumps respectively during the prescribed period of time (for example, during 45 seconds at 500 R. P. M. engine speed). The moment the housing 23, and tube 16 are released and allowed to return to the normal raised position of Figure 1 the flow of the fuel down into the tube 16 and into the receptacle 10 will be shut off.

As the fuel passes down the tube 16 into the receptacle 10 and the level of the liquid begins to rise in the receptacle the air in the air bell becomes entrapped therein. Also any air in the fuel which leaves the discharging bottom end of the tube 16 will pass up into the bell and join the air in the upper portion of the bell. As a result, both of the rise in the level of the liquid fuel in the receptacle and of the delivery of air into the air bell (assuming that there is an air leak along the fuel delivery line), the pressure of the confined air within the air bell will increase, and the level of the fluid within the air bell will be lower than the fluid level on the outside of the air bell.

Let it be assumed that the level of the liquid fuel in the receptacle 10 on the outside of the air bell has risen above the height of the outlet 38' of the outlet air tube 38. In such case, not only will the air within the air bell be under pressure but, since the level of the liquid fuel in the lower portion of the air bell will be below the level on the outside of the air bell, the pressure at the surface of the fuel within the bell will correspond to the pressure in the fuel at the same level on the outside of the air bell and consequently will be greater than ordinary atmospheric pressure. Now let it be further assumed that as more fuel is discharged into the receptacle 10 through the tube 16, the delivered fuel carries fuel vapor (resulting from the suction or partial vacuum to which the liquid fuel was subjected while being drawn by the pump from the fuel tank) and also carries air. Then there will be both vapor bubbles and air bubbles emitted from the bottom end of the tube 16 which will move upwardly in the fuel in the bottom portion of the air bell. However, as far as the vapor bubbles are concerned, since the pressure to which the liquid fuel in the air bell is subjected is greater than atmospheric pressure, and since it is well known that the vapor in such fuel will return to liquid state when the fuel carrying the vapor is pressurized, these vapor bubbles will tend to return to liquid and thus disappear under the pressure of the liquid within the air bell. On the other hand, regardless of the air pressure in the air bell, the air in the fuel discharged from the bottom of the tube 16 will continue to pass up as air bubbles through the liquid in the air bell and join the pressurized air above the liquid. Then, as the volume of air within the air bell is built up in this manner, the excess air will be forced out through the tube 38, with the result that air bubbles will be discharged from the outlet end 38' and be clearly discernible by the observer.

As the level of the liquid in the receptacle 10 continues to rise and the air pressure within the air bell, and the pressure on the liquid in the lower portion of the air bell continues to increase, there will be little, if any, likelihood of fuel vapor being discharged from the tube 38 but, with the continued increase in the volume of air in the air bell some air must, of necessity, be discharged through the outlet tube 38 and thus indicate the fact that air is being drawn into the fuel somewhere along the fuel line, the ascertaining of which fact is the purpose of this portion of the test.

The relative size of the air bell will, of course, depend upon the volume flow in the fuel delivery system to be tested and the general conditions under which the testing is performed, and obviously the device can be made so as to test adequately any size volume flow. I have found, however, that an air bell up to 3 inches in diameter and up to 6 inches in height will be large enough for the testing of the fuel delivery system in any ordinary automotive vehicle and under all normal conditions of operation.

In addition to testing the pump performance and to the special test for air leaks on the suction side of the pump and in the fuel line leading from the fuel storage tank to the pump, it may be desired to test the flow when the flow is restricted, inasmuch as mechanical fuel pumps with check valves must operate against a pressure in actual use. This testing is done by rotating the valve 32 (Figure 1) 90° until the smaller restricting passageway 33' connects the pump with the testing device. The test for restricted flow can then be made in the same way as the flow test previously described.

When the entire test is completed it is desirable to return the fuel, which has been collected in the receptacle 10, to the fuel storage tank for the motor. With the end of the hose 44 inserted in the filling neck of the fuel storage tank the valve 43 is opened and the housing 23 is allowed momentarily to return to raised position in order to close the entrance into the top of tube 16. A flow of fuel from the pump will then take place through the housing 23, valve 43, and hose 44 to the fuel tank. Then the housing 23 is pushed all the way down in order to cause the valve member 27 to close the passageway 25' completely. This normally will cause a siphoning action to be set up (since the receptacle 10 will be at a higher elevation than the fuel storage tank), and this will continue until the receptacle 10 has been emptied, provided the housing 23 is kept constantly pushed down. Should there not be enough flow from the pump to start this siphoning action, the siphon can be started by applying a slight amount of air pressure to the air vent 11' in the cap of the receptacle.

I claim:

1. In a fuel system tester of the character described, including a fuel-receiving receptacle having a transparent wall, a delivery tube extending substantially vertically down into said receptacle with the bottom end of said tube spaced a short distance from the bottom of said receptacle, and means for delivering fuel through said tube into said receptacle, an air bell surrounding said tube in said receptacle, the bottom of said air bell being open and spaced slightly above the bottom of said receptacle, the remaining portion of said air bell being airtight, an air outlet tube extending outwardly through the wall of said air bell and terminating in said receptacle a short distance from said air bell, said outlet tube being located more than half way between the top and the bottom of said air bell wall whereby, with the delivery of liquid fuel into said receptacle through said delivery tube, air pressure will be built up in the upper portion of said air bell and ultimately the delivery of any air with said fuel will cause air to be discharged from said outlet into the liquid fuel outside of said air bell while vapor in said delivered fuel will be subjected to liquifying pressure in the bottom of said air bell.

2. In a fuel system tester of the character described, including a fuel-receiving receptacle having a transparent wall, a delivery tube extending substantially vertically down into said receptacle with the bottom end of said tube spaced a short distance from the bottom of said receptacle, and means for delivering fuel through said tube into said receptacle, a cylindrical air bell surrounding said tube in said receptacle and co-axial with said tube, the bottom of said air bell being open and spaced slightly above the bottom of said receptacle, the remaining portion of said air bell being airtight, the interior diameter of said air bell being considerably greater than the external diameter of said tube, an air outlet tube extending outwardly substantially horizontally through the cylindrical wall of said air bell and terminating in said receptacle a short distance from said air bell, said outlet tube being located below the middle point of said cylindrical wall of said air bell, whereby, with the delivery of liquid fuel into said receptacle through said delivery tube, air pressure will be built up in the upper portion of said air bell and ultimately the delivery of any air with said fuel will cause air to be discharged from said outlet into the liquid fuel outside of said air bell while vapor in said delivered fuel will be subjected to liquifying pressure in the bottom of said air bell.

3. In a fuel system tester of the character described, including a fuel-receiving receptacle having a transparent wall, a delivery tube extending substantially vertically down into said receptacle with the bottom end of said tube spaced a short distance from the bottom of said receptavle, and means for delivering fuel through said tube into said receptacle, an air bell carried on said tube in said receptacle, the bottom of said air bell being open and located approximately in the same horizontal plane as the bottom of said tube, the remaining portion of said air bell being airtight, an air outlet pipe extending outwardly through the wall of said air bell and terminating in said receptacle a short distance from said air bell, said outlet pipe being located at approximately two-thirds of the distance between the top and bottom of said air bell, said outlet pipe within said air bell having a downwardly-extending U-shaped portion whereby, with the delivery of liquid fuel into said receptacle through said delivery tube, air pressure will be built up in the upper portion of said air bell and ultimately the delivery of any air with said fuel will cause air to be discharged from said outlet pipe into the liquid fuel outside of said air bell while vapor in said delivered fuel will be subjected to liquifying pressure in the bottom of said air bell.

4. In a fuel system tester of the character described, including a fuel-receiving receptacle having a transparent wall, a delivery tube extending substantially vertically down into said receptacle with the bottom end of said tube spaced a short distance from the bottom of said receptacle, and means for delivering fuel through said tube into said receptacle, a cylindrical air bell carried on said tube in said receptacle and co-axial with said tube, the bottom of said air bell being open and located approximately in the same horizontal plane as the bottom of said tube, the remaining portion of said air bell being airtight, the interior diameter of said air bell being considerably greater than the external diameter of said tube, an air outlet pipe extending outwardly substantially horizontally through the cylindrical wall of said air bell and terminating in said receptacle a short distance from said air bell, the outer end of said outlet pipe having an oblique upward slope, said outlet pipe within said air bell having a downwardly-extending U-shaped portion whereby, with the delivery of liquid fuel into said receptacle through said delivery tube, air pressure will be built up in the upper portion of said air bell and ultimately the delivery of any air with said fuel will cause air to be discharged from said outlet pipe into the liquid fuel outside of said air bell while vapor in said delivered fuel will be subjected to liquifying pressure in the bottom of said air bell.

References Cited in the file of this patent

UNITED STATES PATENTS

| | | |
|---|---|---|
| 2,566,742 | Odell | Sept. 4, 1951 |
| 2,730,897 | Morse | Jan. 17, 1956 |